(12) United States Patent

He et al.

(10) Patent No.: US 12,640,828 B2

(45) Date of Patent: May 26, 2026

(54) SYSTEMS AND METHODS FOR REPORTING CHANNEL STATE INFORMATION

(71) Applicant: ZTE CORPORATION, Shenzhen (CN)

(72) Inventors: Zhen He, Shenzhen (CN); Shujuan Zhang, Shenzhen (CN); Yijian Chen, Shenzhen (CN); Zhaohua Lu, Shenzhen (CN); Xinquan Ye, Shenzhen (CN); Shuqiang Xia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 386 days.

(21) Appl. No.: 18/231,438

(22) Filed: Aug. 8, 2023

(65) Prior Publication Data

US 2023/0388034 A1 Nov. 30, 2023

Related U.S. Application Data

(63) Continuation of application No. PCT/CN2021/076142, filed on Feb. 9, 2021.

(51) Int. Cl.

| | |
|---|---|
| *H04W 4/00* | (2018.01) |
| *H04B 17/391* | (2015.01) |
| *H04L 5/00* | (2006.01) |
| *H04W 24/10* | (2009.01) |

(52) U.S. Cl.
CPC ......... *H04B 17/391* (2015.01); *H04L 5/0048* (2013.01); *H04W 24/10* (2013.01)

(58) Field of Classification Search
CPC ... H04B 17/391; H04L 5/0048; H04L 5/0057; H04L 5/0007; H04W 24/10; H04W 24/08; H04W 28/04; H04W 72/04; H04W 72/042; H04W 88/08; H04W 28/08; H04W 28/084; H04W 36/22; H04W 72/12

See application file for complete search history.

(56) References Cited

U.S. PATENT DOCUMENTS

| | | | | |
|---|---|---|---|---|
| 11,849,306 B2 * | 12/2023 | Kim | ..................... | H04B 7/0408 |
| 11,963,187 B2 * | 4/2024 | Ma | ......................... | H04L 5/0094 |
| 2020/0374749 A1 * | 11/2020 | Zhang | ................... | H04W 72/23 |
| 2021/0136610 A1 * | 5/2021 | Muruganathan | ...... | H04L 5/0094 |

(Continued)

FOREIGN PATENT DOCUMENTS

| | | |
|---|---|---|
| CN | 103988564 A | 8/2014 |
| CN | 108111278 A | 6/2018 |

(Continued)

OTHER PUBLICATIONS

Convida Wireless, "Multi-beam Enhancements", 3GPP TSG-RAN WG1#103-e, R1-2009158, Nov. 13, 2020, e-Meeting (4 pages).

(Continued)

*Primary Examiner* — Phuongchau Ba Nguyen

(74) *Attorney, Agent, or Firm* — Foley & Lardner LLP

(57) ABSTRACT

Presented are systems and methods for reporting channel state information. A wireless communication device may determine a first set of reference signal (RS) resources. The RS resources may comprise resources for channel measurement. The wireless communication device may send a first channel information associated with the first set of RS resources to a wireless communication node.

16 Claims, 6 Drawing Sheets

(56) References Cited

U.S. PATENT DOCUMENTS

| | | | | | |
|---|---|---|---|---|---|
| 2022/0109483 | A1* | 4/2022 | Nilsson | .............. | H04B 7/06952 |
| 2022/0417776 | A1* | 12/2022 | Manolakos | ........... | H04L 5/0048 |
| 2023/0291452 | A1* | 9/2023 | Chou | ..................... | H04L 5/0051 |
| 2023/0388034 | A1* | 11/2023 | He | ........................ | H04L 5/0057 |

FOREIGN PATENT DOCUMENTS

| | | | |
|---|---|---|---|
| CN | 110100492 | A | 8/2019 |
| CN | 112134664 | A | 12/2020 |
| CN | 112242887 | A | 1/2021 |
| EP | 2 789 199 | B1 | 10/2014 |
| WO | WO-2018/232090 | A1 | 12/2018 |
| WO | WO-2020/051922 | A1 | 3/2020 |

OTHER PUBLICATIONS

Ericsson, "PUSCH coverage enhancement", 3GPP TSG-RAN WG1 Meeting #102-e, R1-2006613, Aug. 28, 2020, e-Meeting (11 pages).

Futurewei, "Sounding enhancement for interference probing in TDD cooperative MIMO", 3GPP TSG RAN WG1 #102-e, R1-2005291, Aug. 28, 2020, e-Meeting (9 pages).

Futurewei, "Sounding enhancement for interference probing in TDD massive MIMO", 3GPP TSG RAN WG1 #103-e, R1-2007547, Nov. 13, 2020, e-Meeting (9 pages).

Nokia et al., "CSI feedback enhancements for URLLC/IIoT use cases", 3GPP TSG RAN WG1 #103-e, R1-2008862, Nov. 13, 2020, e-Meeting (16 pages).

Nokia et al., "Enhancement on CSI measurement and reporting", 3GPP TSG RAN WG1 Meeting #102-e, R1-2006849, Aug. 29, 2020, e-Meeting (19 pages).

NTT Docomo Inc, "Discussion on CSI enhancements", 3GPP TSG RAN WG1 #103-e, R1-2009180, Nov. 13, 2020, e-Meeting (11 pages).

Extended European Search Report for EP Appl. No. 21925130.3, dated Apr. 3, 2024 (10 pages).

International Search Report and Written Opinion for PCT Appl. No. PCT/CN2021/076142, mailed Nov. 9, 2021 (8 pages).

Examination Report No. 1 for AU Appl. No. 2021426916, dated May 2, 2024 (3 pages).

* cited by examiner

| Reference No. | Element |
|---|---|
| 118 | DL Radio Frame |
| 120 | DL Subframe |
| 122 | Data Symbol |
| 124 | UL Radio Frame |
| 127 | UL Subframe |
| 128 | Data Symbol |
| 126, 130 - 140 | Cells |

SYSTEMS AND METHODS FOR REPORTING CHANNEL STATE INFORMATION

CROSS-REFERENCE TO RELATED APPLICATION

This application claims the benefit of priority under 35 U.S.C. § 120 as a continuation of International Patent Application No. PCT/CN2021/076142, filed on Feb. 9, 2021, the disclosure of which is incorporated herein by reference in its entirety.

TECHNICAL FIELD

The disclosure relates generally to wireless communications, including but not limited to systems and methods for reporting channel state information (CSI).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may determine a first set of reference signal (RS) resources. The RS resources may comprise resources for channel measurement. The wireless communication device may send a first channel information associated with the first set of RS resources to a wireless communication node.

In some embodiments, the first channel information may be included in channel state information (CSI). In some embodiments, the first channel information may comprise at least one of: indicators of the first set of RS resources, indicators of a second set of RS resources associated with the first set of RS resources, a first indication information, a combined reference signal received power (RSRP), or a combined signal-to-interference-plus-noise ratio (SINR). In some embodiments, the first set of RS resources or the second set of RS resources may include at least one of: a set of channel state information reference signal (CSI-RS) resources or synchronization signal block (SSB) resources.

In some embodiments, the wireless communication device may determine the first set of RS resources according to at least one of: a set of RS resources for channel measurement, M, K, $\beta$, $P_{max}$, $\eta$, T1, T2, or C. In some embodiments, M may be a number of RS resources in the set of RS resources for channel measurement, or a number of access points (APs). In some embodiments, K may be a number of user equipment (UEs) including the wireless communication device. In some embodiments, $\beta$ may be a channel large scale parameter associated with one of the set of RS resources for channel measurement. In some embodiments, $P_{max}$ may be a maximum transmit power for one of the set of RS resources for channel measurement, or a maximum transmit power for one of the APs. In some embodiments, $\eta$ may be a transmit power factor for one of the set of RS resources for channel measurement or a transmit power factor from one of the APs to one of the UEs. In some embodiments, T1 may be a first predefined threshold. In some embodiments, T2 may be a second predefined threshold. In some embodiments, C may be a predefined threshold that refers to a minimum number of RS resources included in the first set of RS resources.

In some embodiments, the wireless communication device may receive at least one of the M, the K, the $P_{max}$, the $\eta$, the T1, the T2, or the C from the wireless communication node. In some embodiments, the wireless communication device may determine the $\beta$ according to G. The G may refer to a channel response or matrix associated with one of the set of RS resources for channel measurement. In some embodiments, the wireless communication device may determine the $\beta$ as a function of the G. In some embodiments, the wireless communication device may determine the $\beta$ according to: $\beta = (|G|)^2$. In some embodiments, the wireless communication device may sort values of the $\beta$ for different ones of the set of RS resources for channel measurement, according to size, into values of $\beta'$. In some embodiments, the wireless communication device may select first P values of the values of the $\beta'$ to satisfy $$\frac{\sum_{i=1}^{P} \beta'_{ik}}{\sum_{m=1}^{M} \beta_{mk}} \geq T_1$$

and P≥C. In some embodiments, k may indicate that the wireless communication device is a k-th UE of the UEs. In some embodiments, i may be an indicator of one RS resource of the set of RS resources for channel measurement, or an indicator of one of the APs.

In some embodiments, the wireless communication device may sort values of the $\beta$ for different ones of the set of RS resources for channel measurement, according to size, into values of $\beta'$. In some embodiments, the wireless communication device may sort values of the $\eta$ to correspond to the sorted values of the $\beta$, into values of $\eta'$. In some embodiments, the wireless communication device may select first P values of the values of the $\eta'$ and the values of the $\eta'$, to satisfy:

$$\frac{P_{max} \times \sum_{i=1}^{P} \eta'_{ik} \times \beta'_{ik}}{P_{max} \times \left(\sum_{m=1}^{M} \beta_{mk} - \sum_{i=1}^{P} \eta'_{ik} \times \beta'_{ik}\right) + N} \geq T_2$$

and P≥C. In some embodiments, k may indicate that the wireless communication device is a k-th UE of the number of UE. In some embodiments, i may be an indicator of one RS resource of the set of RS resources for channel measurement, or an indicator of one of the APs.

In some embodiments, the wireless communication device may determine the combined RSRP according to a transmit power corresponding to the first set of RS resources. In some embodiments, the wireless communication device may determine the combined RSRP (Combined_RSRP(k)) according to:

Combined_RSRP($k$) =

$$P_{max} \times \sum_{i=1}^{P} \eta'_{ik} \text{ or Combined\_RSRP}(k) = P_{max} \times \sum_{i=1}^{P} \eta'_{ik} \times \beta'_{ik}.$$

In some embodiments, the wireless communication device may determine the combined SINR according to at least one of: a transmit power corresponding to the first set of RS resource, a total transmit power, or a noise power. In some embodiments, the wireless communication device may determine the combined SINR (Combined_SINR(k)) according to:

$$\text{Combined\_SINR}(k) = \frac{P_{max} \times \sum_{i=1}^{P} \eta'_{ik} \times \beta'_{ik}}{P_{max} \times \left(\sum_{m=1}^{M} \beta_{mk} - \sum_{i=1}^{P} \eta'_{ik} \times \beta'_{ik}\right) + N}.$$

In some embodiments, the wireless communication device may send the first channel information to the wireless communication node, responsive to an enable parameter. In some embodiments, the first indication information may be indicative of whether the first channel information includes the indicators of the first set of RS resources or the indicators of the second set of RS resources. In some embodiments, the first channel information may include the indicators of the second set of RS resources, when the number of RS resources in the first set RS resources is larger than or equal to a threshold. In some embodiments, the threshold may be equal to half of the number of the set of RS resources. In some embodiments, the threshold may be indicated by a control signaling.

At least one aspect is directed to a system, method, apparatus, or a computer-readable medium. A wireless communication node may receive a first channel information associated with a first set of reference signal (RS) resources from a wireless communication device. A wireless communication device may determine the first set of RS resources. The RS resources may comprise resources for channel measurement.

In some embodiments, the first channel information may be included in channel state information (CSI). In some embodiments, the first channel information may comprise at least one of: indicators of the first set of RS resources, indicators of a second set of RS resources associated with the first set of RS resources, a first indication information, a combined reference signal received power (RSRP), or a combined signal-to-interference-plus-noise ratio (SINR). In some embodiments, the first set of RS resources or the second set of RS resources may include at least one of: a set of channel state information reference signal (CSI-RS) resources or synchronization signal block (SSB) resources. In some embodiments, the wireless communication device may determine the first set of RS resources according to at least one of: a set of RS resources for channel measurement, M, K, β, $P_{max}$, η, T1, T2, or C. In some embodiments, M may be a number of RS resources in the set of RS resources for channel measurement, or a number of access points (APs). In some embodiments, K may be a number of user equipment (UEs) including the wireless communication device. In some embodiments, β may be a channel large scale parameter associated with one of the set of RS resources for channel measurement. In some embodiments, $P_{max}$ may be a maximum transmit power for one of the set of RS resources for channel measurement, or a maximum transmit power for one of the APs. In some embodiments, η may be a transmit power factor for one of the set of RS resources for channel measurement or a transmit power factor from one of the APs to one of the UEs. In some embodiments, T1 may be a first predefined threshold. In some embodiments, T2 may be a second predefined threshold. In some embodiments, C may be a predefined threshold that refers to a minimum number of RS resources included in the first set of RS resources.

In some embodiments, the wireless communication node may send at least one of the M, the K, the $P_{max}$, the η, the T1, the T2, or the C to the wireless communication device. In some embodiments, the wireless communication device may determine the β according to G. The G may refer to a channel response or matrix associated with one of the set of RS resources for channel measurement. In some embodiments, the wireless communication device may determine the β as a function of the G. In some embodiments, the wireless communication device may determine the β according to: $β=(|G|)^2$. In some embodiments, the wireless communication device may sort values of the β for different ones of the set of RS resources for channel measurement, according to size, into values of β'. In some embodiments, the wireless communication device may select first P values of the values of the β' to satisfy $$\frac{\sum_{i=1}^{P} \beta'_{ik}}{\sum_{m=1}^{M} \beta_{mk}} \geq T_1$$

and P≥C. In some embodiments, k may indicate that the wireless communication device is a k-th UE of the UEs. In some embodiments, i may be an indicator of one RS resource of the set of RS resources for channel measurement, or an indicator of one of the APs.

In some embodiments, the wireless communication device may sort values of the β for different ones of the set of RS resources for channel measurement, according to size, into values of β'. In some embodiments, the wireless communication device may sort values of the η to correspond to the sorted values of the β, into values of η'. In some embodiments, the wireless communication device may select first P values of the values of the β' and the values of the η', to satisfy:

$$\frac{P_{max} \times \sum_{i=1}^{P} \eta'_{ik} \times \beta'_{ik}}{P_{max} \times \left(\sum_{m=1}^{M} \beta_{mk} - \sum_{i=1}^{P} \eta'_{ik} \times \beta'_{ik}\right) + N} \geq T_2$$

and P≥C. In some embodiments, k may indicate that the wireless communication device is a k-th UE of the number of UE. In some embodiments, i may be an indicator of one RS resource of the set of RS resources for channel measurement, or an indicator of one of the APs.

In some embodiments, the wireless communication device may determine the combined RSRP according to a transmit power corresponding to the first set of RS resources. In some embodiments, the wireless communication device may determine the combined RSRP (Combined_RSRP(k)) according to:

$$Combined\_RSRP(k) =$$
$$P_{max} \times \sum\nolimits_{i=1}^{P} \eta'_{ik} \text{ or } Combined\_RSRP(k) = P_{max} \times \sum\nolimits_{i=1}^{P} \eta'_{ik} \times \beta'_{ik}.$$

In some embodiments, the wireless communication device may determine the combined SINR according to at least one of: a transmit power corresponding to the first set of RS resource, a total transmit power, or a noise power. In some embodiments, the wireless communication device may determine the combined SINR (Combined_SINR(k)) according to:

$$Combined\_SINR(k) = \frac{P_{max} \times \sum_{i=1}^{P} \eta'_{ik} \times \beta'_{ik}}{P_{max} \times \left( \sum_{m=1}^{M} \beta_{mk} - \sum_{i=1}^{P} \eta'_{ik} \times \beta'_{ik} \right) + N}.$$

In some embodiments, the wireless communication node may receive the first channel information from the wireless communication devicef, responsive to an enable parameter. In some embodiments, the first indication information may be indicative of whether the first channel information includes the indicators of the first set of RS resources or the indicators of the second set of RS resources. In some embodiments, the first channel information may include the indicators of the second set of RS resources, when the number of RS resources in the first set RS resources is larger than or equal to a threshold. In some embodiments, the threshold may be equal to half of the number of the set of RS resources. In some embodiments, the threshold may be indicated by a control signaling.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

6

Figure 4:
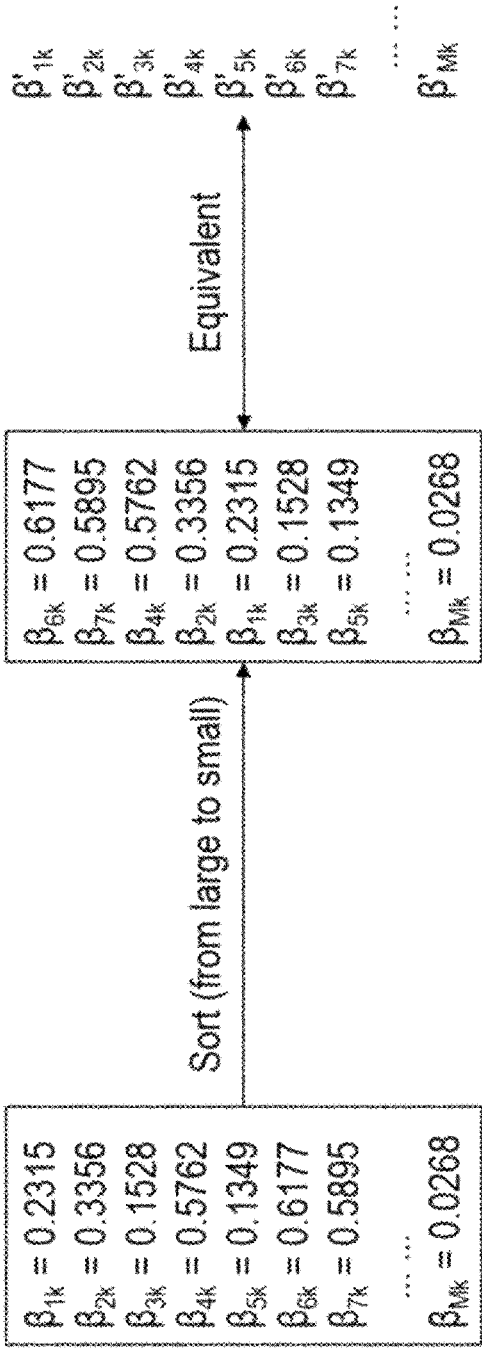
Figure 5:
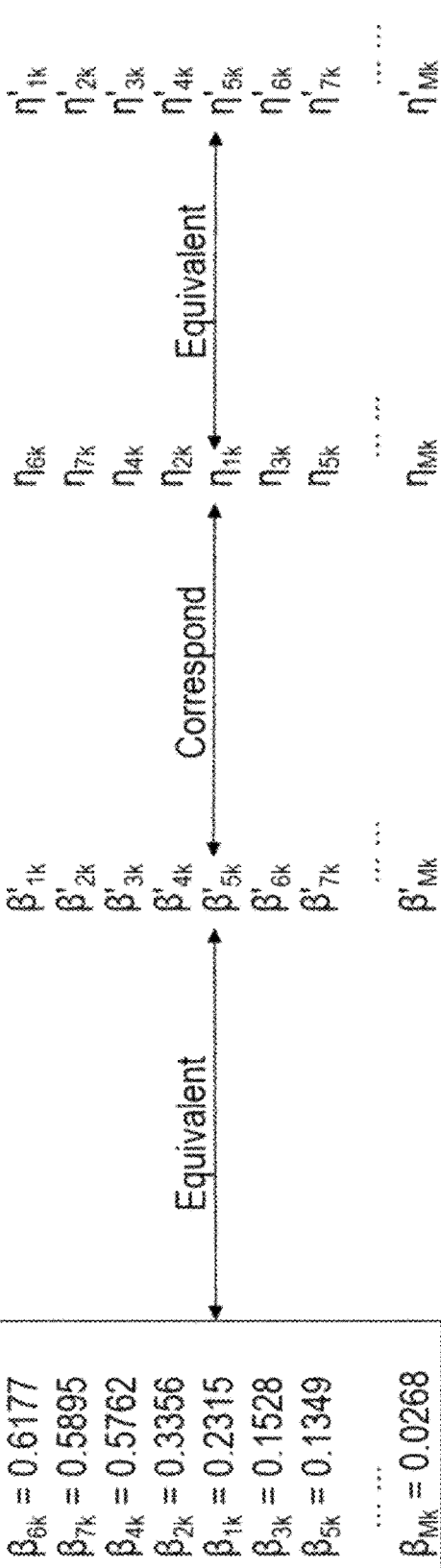
Figure 6:
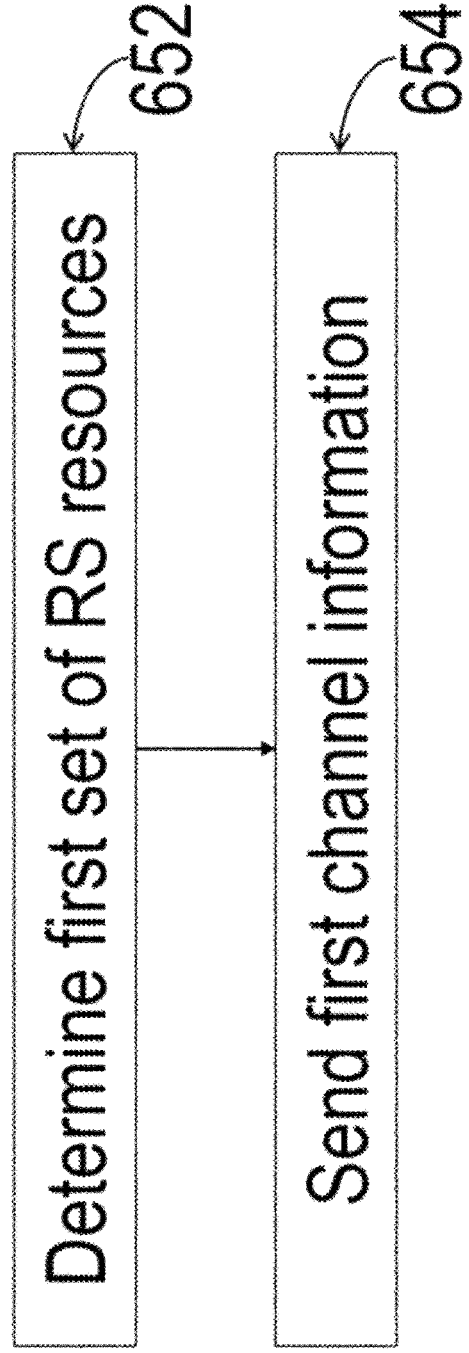

FIG. 4 illustrates example approaches for sorting Ps, in accordance with some embodiments of the present disclosure;

FIG. 5 illustrates example approaches for sorting Ps and/or res, in accordance with some embodiments of the present disclosure; and FIG. 6 illustrates a flow diagram of an example method for reporting channel state information, in accordance with an embodiment of the present disclosure.

DETAILED DESCRIPTION

1. Mobile Communication Technology and Environment

Figure 1:
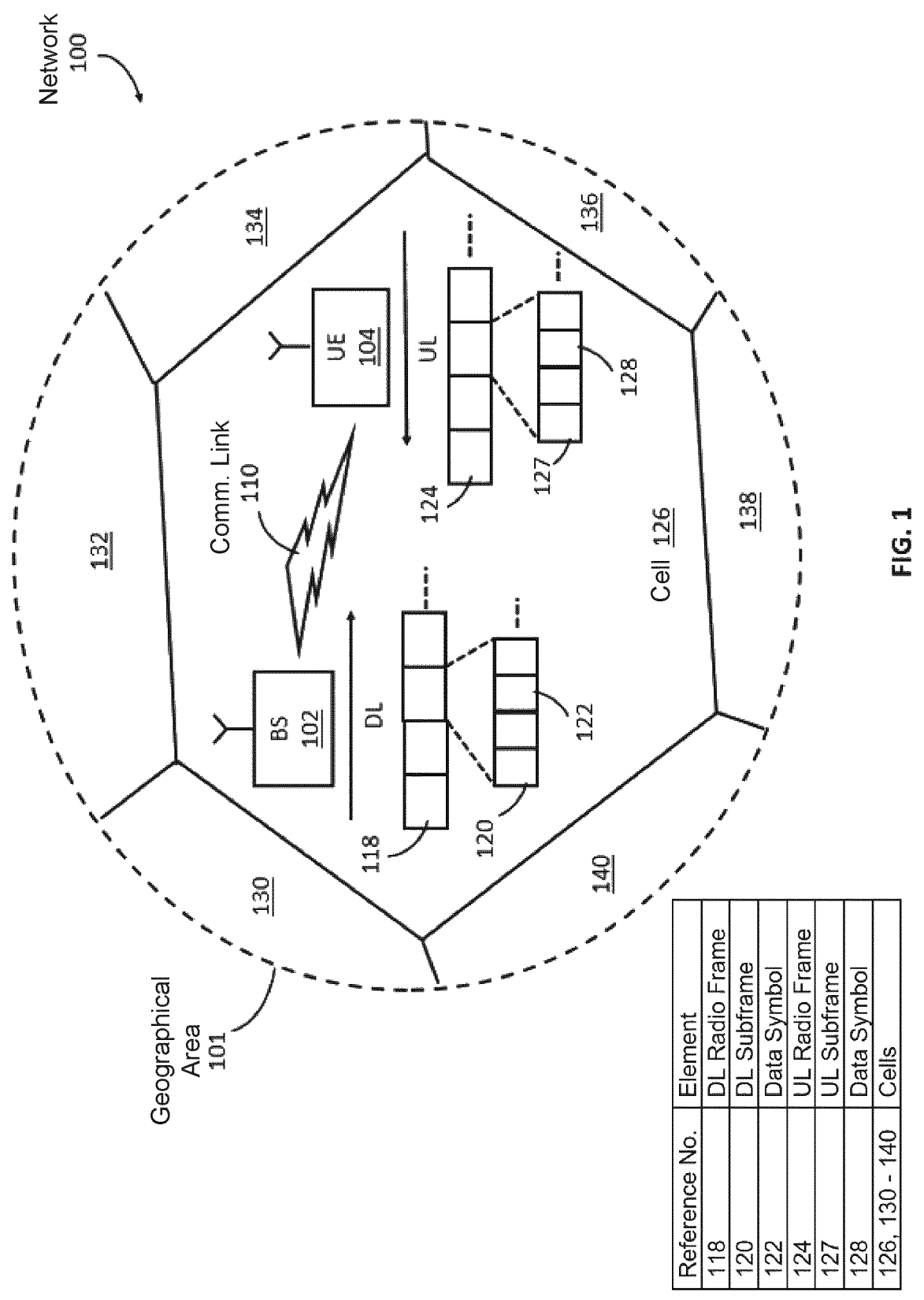
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
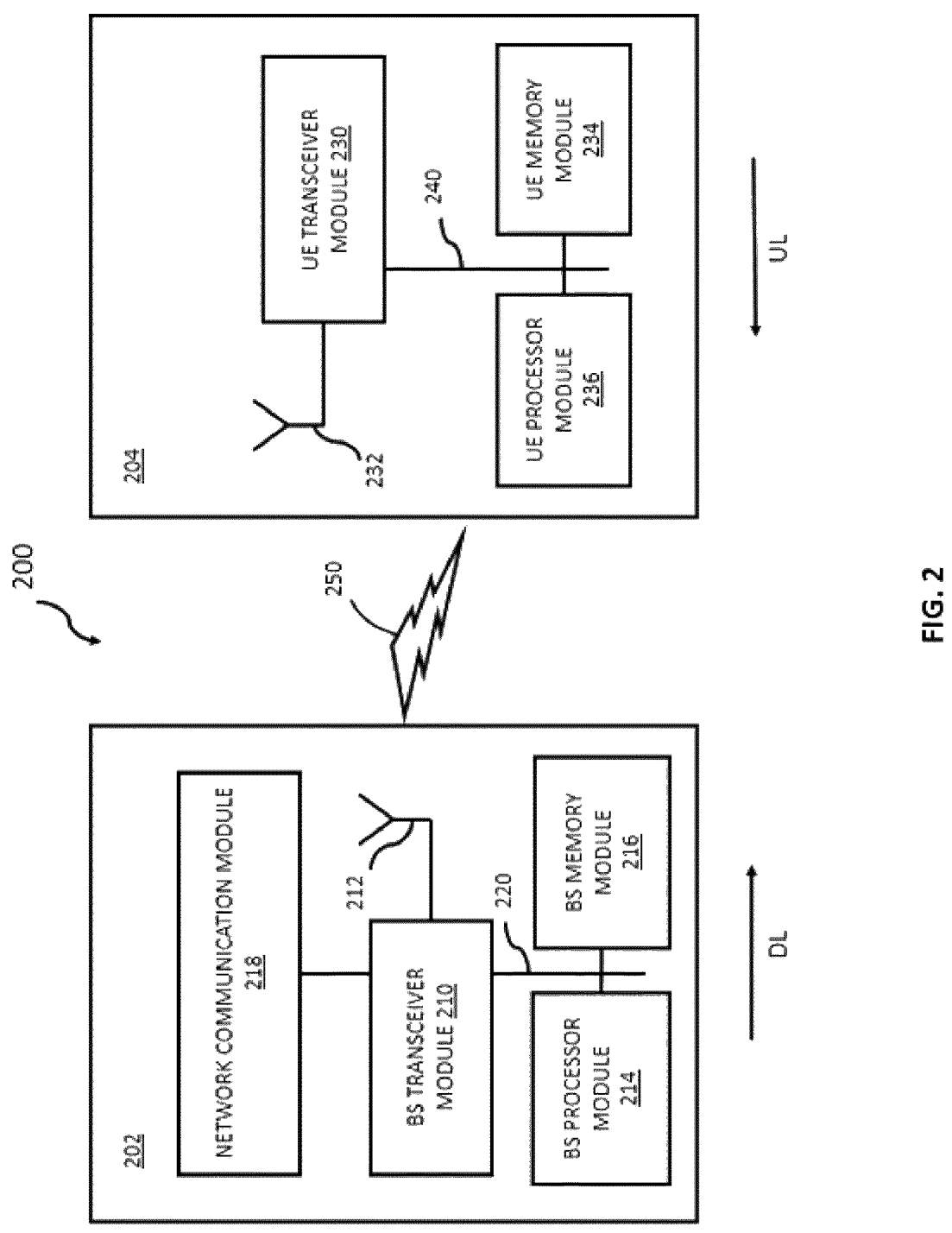
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Reporting Channel State Information

Certain systems (e.g., cell-free networks and/or other systems) may include a plurality of access points (APs). In said systems, such as cell-free networks, the number/amount of APs may be greater/larger than the number of wireless communication devices (e.g., a UE, a terminal, and/or a served node). One or more wireless communication devices (e.g., one or more UEs) may report/send/provide/indicate/specify channel state information (CSI) for each AP. The CSI of each AP may include a channel state information reference signal resource indicator (CRI), a reference signal received power (RSRP), a signal-to-interference-plus-noise ratio (SINR), a channel quality indicator (CQI), and/or other channel information. The one or more wireless communication devices may consume/use/expend a large number of uplink (UL) channel (e.g., physical uplink control channel (PUCCH), physical uplink shared channel (PUSCH), and/or other UL channels) resources when reporting the CSI, thereby limiting/reducing/restricting (the throughput of) UL data transmissions. The systems and methods presented herein include a novel approach for reducing the consumption of UL channel resources during CSI reporting by at least 25% (e.g., 35, 45 or other percent), for example. For instance, the systems and methods may include an effective connection quality reporting method. The connection quality reporting method may allow the network to determine/identify the APs serving a wireless communication device.

Massive multiple-input multiple-output (MIMO) can be a key aspect of next generation (NG) technology, such as 5G technology. Massive MIMO systems may use massive antenna arrays to provide an increased beamforming gain and/or spatial multiplexing of one or more users. Furthermore, massive MIMO systems may improve/increase/enhance spectral and/or energy efficiency. Massive MIMO systems comprise a centralized solution for increasing the density of a network. The performance of massive MIMO systems may be limited/restricted by inter-cell interference inherent to a cell-centric design. Conversely, a cell-free massive MIMO system (e.g., a cell-free network) may include or correspond to a distributed massive MIMO system that implements coherent user-centric transmission to overcome the limitations of inter-cell interference in cellular networks. Furthermore, cell-free massive MIMO systems may provide additional macro-diversity.

In a traditional cellular network, each wireless communication device (e.g., a UE) may be connected to an access point (AP) in one of a plurality of cells. However in a cell-free network, one or more APs of a network may cooperate/collaborate to jointly serve the wireless communication device(s) in a user-centric fashion. Cell-free networks may lack cell boundaries during data transmissions. In some embodiments of the present disclosure, an AP serving at least one wireless communication device may include or correspond to a serving AP. In some embodiments, cell-free networks (or other systems) may comprise a plurality of APs. The number/amount/quantity of APs in a cell-free network may be greater/larger than the number of wireless communication devices. A wireless communication node (e.g., a central processing unit (CPU), a ground terminal, a base station, a gNB, an eNB, a transmission-reception point (TRP), a network (NW), or a serving node) may obtain/measure/acquire/determine a connection (or channel) quality between each AP and a wireless communication device (e.g., UE). The connection/channel quality between each AP and the wireless communication device may be used to determine/identify the AP(s) serving the wireless communication device(s). Therefore, the one or more APs with a better/superior connection quality can serve the wireless communication device(s).

According to certain specifications, the wireless communication device may report/send/provide/specify/indicate the connection quality of each AP in a cell-free network. The connection quality of each AP may include a CRI, a reference signal received power (L1-RSRP), a SINR, a CQI, and/or other connection/channel quality information. Reporting/providing/specifying the connection quality of each AP may consume/use a large amount of UL channel resources, thereby limiting/reducing/restricting (the throughput of) the UL data transmissions. The systems and methods presented herein include an effective connection quality reporting method to reduce/decrease the consumption/use of reporting resources. The quality reporting method may allow the network to determine/identify/select the one or more APs serving the wireless communication device (e.g., UE).

In some embodiments of the present disclosure, a CPU may include or correspond to a base station (BS), a NR NodeB (also known as gNodeB or gNB), and/or network (NW). In some embodiments, a channel measurement resource (CMR) may include one or more resources for channel measurement and/or interference measurement (e.g., interference measurement resource (IMR)).

In some embodiments, the wireless communication device (e.g., UE) may report/specify/send/indicate/provide the CSI (e.g., the CSI including or corresponding to the first channel information) of one or more APs (e.g., one or more resources for channel measurement). The systems and methods presented herein include a novel approach for effectively calculating and/or reporting the CSI in order to reduce/ decrease the resource overhead of reporting the CSI. Specifically, the systems and methods may comprise one or more embodiments discussed herein.

The wireless communication device (e.g., a UE) may report/send/provide/specify/indicate a first channel information to the wireless communication node (e.g., a CPU). The first channel information may include at least one of: a first set of reference signal (RS) resource indicators (e.g., indicators of a first set of RS resources), a combined RSRP, a combined SINR, a first indication information, a second set of RS resource indicators associated with a first set of RS resources (e.g., indicators of a second set of RS resources associated with the first set of RS resources), and/or other information. In some embodiments, the CSI may include or correspond to the first channel information. The first set of RS resource indicators may include/specify/indicate the set of indices (e.g., IDs) corresponding to N (e.g., N≥1) RS resources. In some embodiments, the RS resource can be used as a channel measurement resource (CMR). The combined RSRP and/or the combined SINR (e.g., for a set of CRI) may include or correspond to a combined channel quality between a set of APs (e.g., a set of RS resources) and the wireless communication device. The combined/merged/ integrated RSRP/SINR may be different/separate/distinct from the L1-RSRP and/or the signal-to-interference-plus-noise ratio (L1-SINR). Specifically, the L1-RSRP and/or L1-SINR may indicate/specify/provide/include a channel quality between a single AP and a wireless communication device. However, the combined RSRP/SINR may indicate/ specify/provide/include a combined channel quality between one or more APs and at least one wireless communication device (e.g., a set of APs (or RS resources) and a UE").

Furthermore, the first/second set of RS resource indicators may include at least one of: a set of one or more CRIs and/or a set of one or more synchronization signal block resource indicators (SSBRIs).

Furthermore, the first/second set of RS resources may include at least one of: a set of one or more channel state information reference signal (CSI-RS) resources and/or a set of one or more synchronization signal block (SSB) resources.

Figure 3:
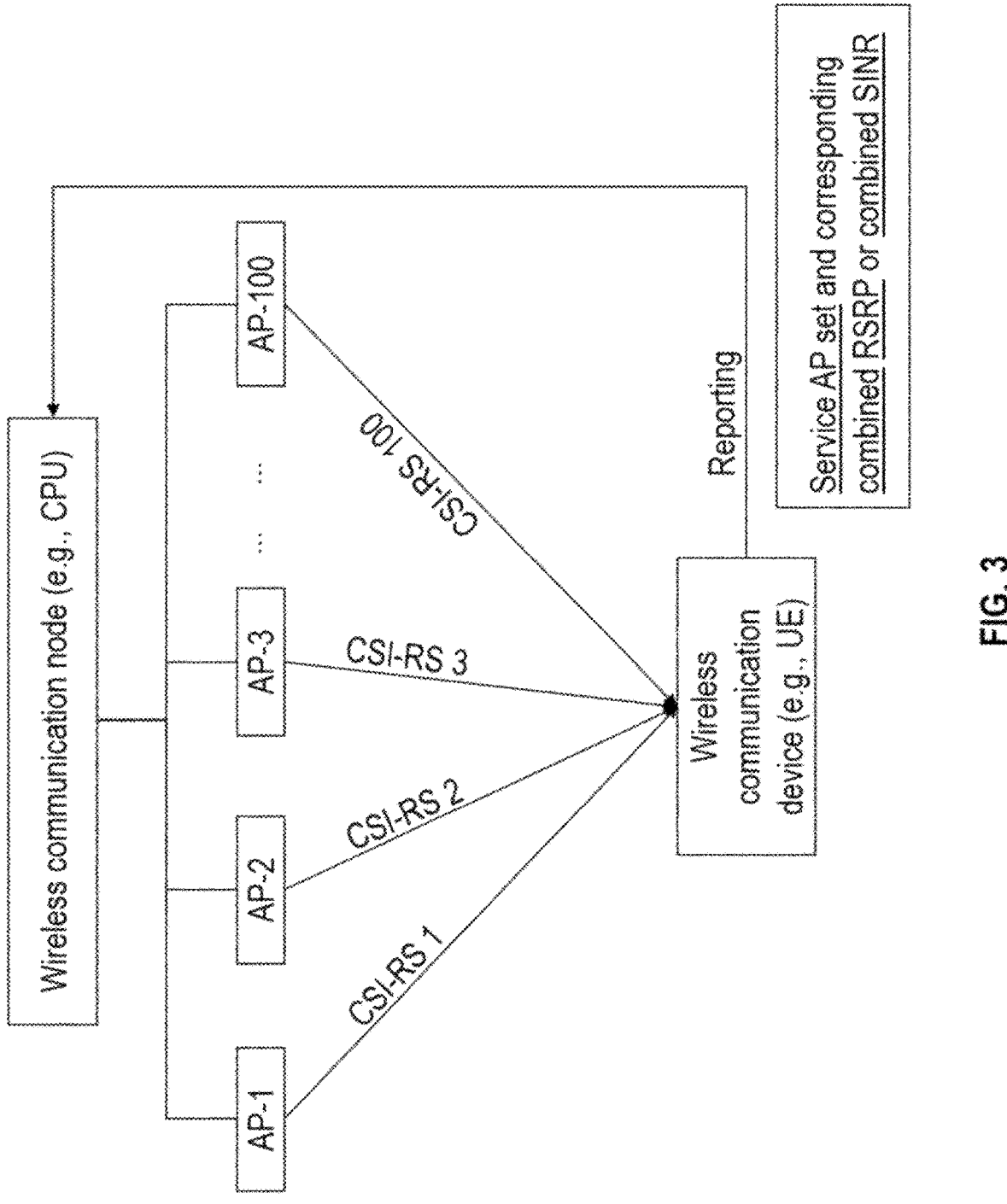
FIG. 3 illustrates an example communication network, in accordance with some embodiments of the present disclosure.

Referring now to FIG. 3, depicted is an example communication network 300. In some embodiments, at least 100 (or other values) APs can be deployed in an area (e.g., AP-1, AP-2, AP-3, . . . , AP-100). The APs may be connected to a same wireless communication node (e.g., CPU) through/via backhaul. The wireless communication node may schedule one or more (or all) APs and/or one or more (or all) wireless communication devices in the area (e.g., schedule one or more APs to serve one or more wireless communication devices). For instance, the wireless communication node may provide/specify/indicate a UE reporting related configuration (e.g., a measurement resource and/or a reporting resource, such as a CSI-RS) to schedule the AP(s) to serve at least one wireless communication device. In some embodiments, the wireless communication node may determine/configure/identify/select the one or more APs serving the wireless communication device. In order to determine the AP(s) serving the wireless communication device, the wireless communication node may configure at least 100 (or other values) CMRs (e.g., at least 100 CSI-RS resources). Each CSI-RS (or other CMR) may correspond to an AP. Therefore, the at least 100 APs may transmit/send/broadcast/ communicate 100 independent/separate CSI-RSs (or other CMRs) to the wireless communication device.

The wireless communication device (e.g., UE) may receive/obtain the independent CSI-RSs transmitted by the APs. After receiving at least one CSI-RS, the wireless communication device may assess/analyze/evaluate/measure the channel between the AP corresponding to (or associated with) the received CSI-RS and the wireless communication device. For example, the wireless communication device may receive/obtain CSI-RS2 (or other CSI-RSs) from AP-2 (or other APs). Responsive to receiving CSI-RS2, the wireless communication device may assess the channel (e.g., the channel quality) between AP-2 and the wireless communication device.

In some embodiments, the wireless communication device may determine/identify at least 100 channels (or other number of channels) corresponding to the at least 100 APs. The wireless communication device may determine the at least 100 channels according to (or based on) the at least 100 CSI-RSs (or other CMRs). Responsive to determining/ identifying the channels, the wireless communication device may determine a set of one or more APs serving the wireless communication device (e.g., a service AP set). The wireless communication device may determine/identify the service AP set according to (or by using) predefined methods and/or the assessed channel(s). Lastly, the wireless communication device may report/send/transmit the CRIs (or other channel information) corresponding to the service AP set. In some embodiments, the wireless communication device may report/send the combined RSRP and/or the combined SINR corresponding to the service AP set (e.g., instead of the L1-RSRP and/or L1-SINR of each AP). The service AP set may include the optimal combined RSRP and/or combined SINR. Therefore, the indicators of the first set of RS resources may correspond to the combined RSRP and/or the combined SINR.

In some embodiments, the first set of RS resource indicators may correspond to the combined RSRP and/or the combined SINR. The combined RSRP and/or the combined SINR may be determined/configured according to (or based on) the first set of RS resources.

In some embodiments, the wireless communication device may determine/configure the first set of RS resources (or RS resource indicators). The wireless communication device may determine the first set of RS resources according to (or based on) at least one of: a set of RS resources for channel measurement, M, K, $\beta$, $P_{max}$, $\eta$, T1, T2, and/or C. Specifically, M may include/specify/indicate a number of RS resources (e.g., a number of APs) in the set of RS resources for channel measurement and/or interference measurement. In some embodiments, K may include or correspond to a number/quantity/amount of user equipment (UE) including the wireless communication device. In some embodiments, $\beta$ may include/specify/indicate a channel large scale parameter associated with one of the set of RS resources for channel measurement (e.g., a channel large scale parameter between the AP and the wireless communication device). In some embodiments, $P_{max}$ may specify/include a maximum transmit power for one of the set of RS resources for channel measurement and/or a maximum transmit power for one of the APs. In some embodiments, $\eta$ may include or correspond to a transmit power factor for one of the set of RS resources for channel measurement and/or a transmit power factor from one of the APs to one of the UEs (or other wireless communication devices). For example, if $\eta$ has a value of 0.5 ($\eta$=0.5), the transmit power from one of the APs to one of the UEs may be $0.5*P_{max}$. In some embodiments, T1 and/or T2 may specify/indicate a predefined threshold, such as a first predefined threshold and/or a second predefined threshold. In some embodiments, C may include or correspond to a predefined threshold that refers to a minimum number of RS resources included in the first set of RS resources (or RS resource indicators).

In some embodiments, the wireless communication device (e.g., UE) may receive/obtain at least one of the M, the K, the $P_{max}$, the $\eta$, the T1, the T2, and/or the C from the wireless communication node (e.g., CPU). The wireless communication node may provide/communicate/send/specify/indicate at least one of the M, the K, the $P_{max}$, the $\eta$, the T1, the T2, and/or the C to the wireless communication device.

In some embodiments, the wireless communication device may determine/configure the $\beta$ according to G. The G may specify/indicate/include a channel response or matrix associated with one of the set of RS resources for channel measurement (e.g., a channel response or matrix between the AP and the wireless communication device). In some embodiments, a received signal (Y), a transmitted signal (X), a noise (N) and/or the channel response or matrix (G) may satisfy the following condition:

$$Y = G \times X + N$$

In some embodiments, the wireless communication device may determine/configure $\beta$ according to the following condition:

$$\beta = (|G|)^2$$

For example, "AP-m" may specify/indicate an $m^{th}$ AP from the M number of APs. Furthermore, a "wireless communication device-k" may refer to a $k^{th}$ wireless communication device from the K number of wireless communication devices. In some embodiments, $\beta_{mk}$ may correspond to the $\beta$ between AP-m and wireless communication device-k. For instance, $\beta_{3k}$ may refer to the $\beta$ between AP-3 (or other APs) and wireless communication device-k. The following approach can be applied/used to determine/configure the service AP set of FIG. 3, for instance. First, for a same wireless communication device (e.g., wireless communication device-k), the $\beta$s of the one or more APs corresponding to the wireless communication device-k may be sorted/organized/arranged/ordered. For instance, the wireless communication device may sort/organize/order the values of the $\beta$ for different ones of the set of RS resources for channel measurement (e.g., for one or more APs), according to (or based on) size. In some embodiments, the $\beta$s of the one or more APs (e.g., corresponding to the wireless communication device-k) may be sorted according to the value/size of $\beta$. For example, the $\beta$s can be sorted/organized from the $\beta$ with the largest value to the $\beta$ with the smallest value. In some embodiments, the $\beta$s can be sorted/organized from the smallest value of $\beta$ to the largest value of $\beta$.

Referring now to FIG. 4, depicted is an example approach for sorting $\beta$s. In this example, $\beta_{6k}$ has the largest value, corresponding to 0.6177 (or other values). In the same example, $\beta_{7k}$ has a value of 0.5895, which is the second largest value among the $\beta$s. Therefore, the $\beta$s can be sorted from the largest value of $\beta$ to the smallest value of $\beta$, starting with $\beta_{6k}$ and followed by $\beta_{7k}$. The remaining $\beta$s are sorted in a same/corresponding manner (e.g., $\beta_{6k}$, $\beta_{7k}$, $\beta_{4k}$, $\beta_{2k}$, $\beta_{1k}$, $\beta_{3k}$, $\beta_{5k}$, . . . , $\beta_{MK}$). In some embodiments, the Ps can be sorted/organized/arranged according to other criteria. In some embodiments, the $\beta$s that have been sorted/organized/ordered can be represented by $\beta'$. For instance, if the $\beta$s have been sorted from the largest value of $\beta$ to the smallest value of $\beta$, $\beta'_{1k}$ may correspond to $\beta_{6k}$ (e.g., the $\beta$ with the largest value). In some embodiments, the wireless communication device may select/determine the first P values of the $\beta'$ to satisfy the following condition:

$$\frac{\sum_{i=1}^{P} \beta'_{ik}}{\sum_{m=1}^{M} \beta_{mk}} \geq T_1$$

Furthermore, the value of P may satisfy the following condition:

$$P \geq C$$

The parameter i may correspond to an indicator of one RS resource of the set of RS resources for channel measurement and/or an indicator of one of the APs. In some embodiments, if k=1 (e.g., the number of wireless communication devices is 1, or when considering a scenario particular to a specific wireless communication device or UE), the parameter k may be excluded/omitted/removed from the conditions/equations presented herein.

In some embodiments, the wireless communication device may determine/configure/calculate the parameter C. The wireless communication device may use a parameter A (or other parameters) to determine/configure/calculate the parameter C. The wireless communication node may provide/specify/indicate/send/transmit the parameter A to the wireless communication device. The wireless communication device may determine the parameter C according to (or based on) the following condition:

$$C = A \times \frac{M}{K}$$

In some embodiments, the AP(s) that correspond to (or are associated with) the first P values of $\beta'$ that satisfy/meet/fulfill the conditions presented herein may be used as the service AP set.

In some embodiments, the following approach can be used to determine/configure/identify the service AP set. The parameter ilia may include or correspond to the transmit power factor $\eta$ from AP-m to wireless communication device-k. In some embodiments, the parameter N may refer to noise. In some embodiments, the wireless communication device (e.g., wireless communication device-k) may determine/calculate/configure the values of $\beta$ (e.g., $\beta_{1k}$, $\beta_{2k}$, $\beta_{3k}$, $\beta_{4k}$, $\beta_{5k}$, $\beta_{6k}$, $\beta_{7k}$, ..., $\beta_{Mk}$) according to one or more values of G, for instance. Responsive to determining the values of $\beta$, the wireless communication device may sort the values of $\beta$ (e.g., $\beta_{6k}$, $\beta_{7k}$, $\beta_{4k}$, $\beta_{2k}$, $\beta_{1k}$, $\beta_{3k}$, $\beta_{5k}$, ..., $\beta_{Mk}$) into values of $\beta'$ (e.g., $\beta'_{1k}$, $\beta'_{2k}$, $\beta'_{3k}$, $\beta'_{4k}$, $\beta'_{5k}$, $\beta'_{6k}$, $\beta'_{7k}$, ..., $\beta'_{Mk}$) according to size. Furthermore, the wireless communication device may determine/configure a value of $\eta$ corresponding to a value of $\beta'$ (e.g., $\eta'$), as shown in FIG. 5. For instance, the wireless communication device may sort/order the values of $\eta$ (e.g., $\eta_{6k}$, $\eta_{7k}$, $\eta_{4k}$, $\eta_{2k}$, $\eta_{1k}$, $\eta_{3k}$, $\eta_{5k}$, ..., $\eta_{Mk}$) to correspond to the sorted values of $\beta$ (e.g., $\beta_{6k}$, $\beta_{7k}$, $\beta_{4k}$, $\beta_{2k}$, $\beta_{1k}$, $\beta_{3k}$, $\beta_{5k}$, ..., $\beta_{Mk}$), into values of $\eta'$ (e.g., $\eta'_{1k}$, $\eta'_{2k}$, $\eta'_{3k}$, $\eta'_{4k}$, $\eta'_{5k}$, $\eta'_{6k}$, $\eta'_{7k}$, ..., $\eta'_{Mk}$). Responsive to sorting the values of $\eta$ into values of $\eta'$, the wireless communication device may select/identify/determine the first P values of $\beta'$ and $\eta'$ that satisfy the following condition:

$$\frac{P_{max} \times \sum_{i=1}^{P} \eta'_{ik} \times \beta'_{ik}}{P_{max} \times \left(\sum_{m=1}^{M} \beta_{mk} - \sum_{i=1}^{P} \eta'_{ik} \times \beta'_{ik}\right) + N} \geq T_2$$

Furthermore, the parameter P may satisfy the following conditions:

$$P \geq C$$

$$C = A \times \frac{M}{K}$$

In some embodiments, the AP(s) corresponding to (or associated with) the first P values of $\beta'$ and $\eta'$ can be used as the service AP set. If k=1 (e.g., the number of wireless communication devices is 1), the parameter k may be excluded/omitted/removed from the conditions/equations presented herein.

In some embodiments, the wireless communication device may determine/configure/calculate the combined RSRP according to a transmit power. The transmit power may correspond to (or be associated with) a first set of RS resources or resource indicators (e.g., a set of CMRs). The wireless communication device may determine/configure the combined RSRP according to (or based on):

$$\text{Combined\_RSRP}(k) = P_{max} \times \sum_{i=1}^{P} \eta'_{ik}$$

Furthermore, the wireless communication device may determine the combined RSRP according to a weighted transmit power. The weighted transmit power may correspond to a first set of RS resources or resource indicators (e.g., a set of CMRs). In some embodiments, $\beta$ and/or $\eta$ can be used as a weight factor of the weighted transmit power. For example, the wireless communication device may determine the combined RSRP (e.g., according to a weighted transmit power corresponding to the service AP set) according to:

$$\text{Combined\_RSRP}(k) = P_{max} \times \sum_{i=1}^{P} \eta'_{ik} \times \beta'_{ik}$$

Furthermore, the wireless communication device may determine/configure/calculate the combined SINR according to at least one of: a transmit power corresponding to a first set of RS resources or resource indicators (e.g., a set of CMRs), a total transmit power, and/or a noise power. In some embodiments, the power factor $\eta$ may not be considered for the total transmit power. For instance, one or more service APs (or all service APs) may transmit/send/broadcast a signal to the wireless communication device with full power. Therefore, the wireless communication device may calculate/determine the interference power corresponding to a set of CMR. The interference power may include or correspond to the difference between the total transmit power and the transmit power. For example, the wireless communication device may determine the combined SINR according to:

$$\text{Combined\_SINR}(k) = \frac{P_{max} \times \sum_{i=1}^{P} \eta'_{ik} \times \beta'_{ik}}{P_{max} \times \left(\sum_{m=1}^{M} \beta_{mk} - \sum_{i=1}^{P} \eta'_{ik} \times \beta'_{ik}\right) + N}$$

In some embodiments, the wireless communication device (e.g., UE) may be provided with an enable parameter (e.g., by the wireless communication node). For instance, the wireless communication device may obtain/acquire/receive the enable parameter via signaling, such as radio resource control (RRC) signaling, medium access control control element (MAC-CE) signaling, downlink control information (DCI), and/or other types of signaling. If the wireless communication device receives/obtains an enable parameter, the wireless communication device may report/send/specify/indicate the first channel information to the wireless communication node. For instance, the wireless communication device may report/send the first channel information responsive to receiving/obtaining the enable parameter from the wireless communication node via RRC signaling.

Furthermore, the enable parameter may enable/cause the wireless communication device to report/send/communicate at least one of: the set of RS resources (or resource indicators), the combined RSRP and/or the combined SINR. If the wireless communication device fails to receive/obtain the enable parameter, the wireless communication device may report/specify/indicate a RS resource indicator (e.g., a CRI), a L1-RSRP, and/or a L1-SINR. For example, the wireless communication device can be configured with the enable parameter in a cell-free network. Responsive to being configured with the enable parameter, the wireless communication device may report the set of RS resources (e.g., the service AP set) and/or a corresponding combined RSRP/SINR. In a cellular network, the wireless communication device may not be configured with the enable parameter (e.g., the enable parameter can be disabled). In a cellular network, for instance, the wireless communication device may report/send/specify a RS resource indicator (e.g., a service AP) and/or a corresponding L1-RSRP/SINR. In some embodiments, "the wireless communication device is (not) provided with the enable parameter" may indicate that "the wireless communication device is configured with the enable parameter, wherein the enable parameter can be set to enable (or disable)". In any of the above examples, methods, conditions, and/or equations, the parameter $\beta$ can be replaced with at least one of: G, |G|, or $|G|^2$.

In some embodiments, the first set of RS resources (or resource indicators) may include a large amount/quantity/ number of RS resources (or resource indicators). If the first set of RS resources includes a large amount/number of RS resources, the wireless communication device may report/ send/provide/indicate/communicate a large number of CRIs. Therefore, a large service AP set may cause an excessive/ unnecessary overhead of reporting resources. In one example, the total number of APs may be 10 (or other values), while the number of service APs may be 9 (or other values). In this example, if the wireless communication device reports 9 CRIs to the wireless communication node (e.g., CPU), a large amount of reporting resources may be consumed/used (e.g., almost all CRIs are reported). The systems and methods presented herein include an effective approach for solving this problem (e.g., reduce the consumption of reporting resources).

For instance, the wireless communication device may be configured with a first threshold. If the number of service APs is larger than the first threshold, the wireless communication device may report the CRIs corresponding to (or associated with) the remaining APs (e.g., the non-service APs). In one example, the first threshold may have a value of 5 (or other values) service APs. Therefore, if the total number of APs is 10 and the number of service APs is 9, the wireless communication device may determine that the number of service APs (e.g., 9) is larger than the first threshold (e.g., 5 service APs). Responsive to determining the number of service APs exceeds the first threshold, the wireless communication device may report the other 1 CRI (e.g., the CRI corresponding to the non-service AP) to the wireless communication node. Therefore, the reporting resources consumed by reporting/sending 8 CRIs (e.g., the CRIs of the service APs) can be reduced by reporting only 1 CRI (e.g., the CRI of the non-service AP).

In some embodiments, the first channel information may include at least one of: a second set of RS resources (or resource indicators) and/or a first indication information. The first channel information may include the second set of RS resources in place of the first set of RS resources. The second set of RS resources may be associated/related with the first set of RS resources. The first indication information can be used to indicate/specify whether the first channel information includes the indicators of the first set of RS resources and/or the indicators of the second set of RS resources. If the second set of RS resources is associated with the first set of RS resources, the first set of RS resources can be determined/configured according to (or by using) the second set of RS resources (and/or vice versa). For example, a first set of CRIs and/or a second set of CRIs may belong to (or be included in) a same/corresponding CSI-RS resource set. Assuming the CRIs are {0,1,2,3,4,5}, if the first set of CRIs is {0,1,3}, the second set of CRIs can be {2,4,5}.

The first channel information may include the second set of RS resources (or resource indicators) if one or more of the following conditions are met/satisfied.

The number of RS resources (or resource indicators) in the first set of RS resources may be larger than or equal to a threshold. In some embodiments, the threshold may be equal to half of the number of the set of RS resources for channel measurement.

In some embodiments, the threshold may be provided/indicated/specified by/via a control signaling (e.g., RRC signaling, MAC-CE signaling, and/or DCI).

In some embodiments, the wireless communication device may determine/configure the threshold. The wireless communication device may determine the threshold according to (or based on) the number of CMRs configured by the wireless communication node (e.g., CPU). For example, the wireless communication device may determine the threshold is equal to half of the number of configured CMRs.

A. Reporting Channel State Information

FIG. 6 illustrates a flow diagram of a method 650 for reporting channel state information. The method 650 may be implemented using any of the components and devices detailed herein in conjunction with FIGS. 1-5. In overview, the method 650 may include determining a first set of RS resources (652). The method 650 may include sending first channel information (654).

Referring now to operation (652), and in some embodiments, a wireless communication device (e.g., a UE) may determine/identify a first set of reference signal (RS) resources (e.g., a first set of RS resource indicators). The RS resources may comprise resources for channel measurement (e.g., one or more CMRs). In some embodiments, the wireless communication device may determine/select/configure the first set of RS resources (e.g., a set of RS resources including P number of RS resources) according to at least one of: a set of RS resources (e.g., a set of RS resources including M number of resources, wherein M>P) for channel measurement, M, K, $\beta$, $P_{max}$, $\eta$, T1, T2, or C. The first set of RS resources may include or correspond to a set of RS resources configured by the wireless communication node. In some embodiments, the parameter M may indicate/ specify/refer to a number of RS resources in the set of RS resources for channel measurement. Furthermore, the parameter M may indicate/specify a number of APs. In some embodiments, the parameter K may include or correspond to a number of user equipment (UEs) including the wireless communication device. In some embodiments, the parameter $\beta$ may indicate/specify a channel large scale parameter. The channel large scale parameter may be associated/related with one of the set of RS resources for channel measurement. For example, $\beta$ may indicate/specify the channel large scale parameter between an AP and a wireless communication device. In some embodiments, the parameter $P_{max}$ may include or correspond to a maximum transmit power for one of the set of RS resources for channel measurement. Furthermore, the parameter $P_{max}$ may include or correspond to a maximum transmit power for one of the APs. In some embodiments, the parameter $\eta$ may be a transmit power factor for one of the set of RS resources for channel measurement. Furthermore, the parameter $\eta$ may be a transmit power factor from one of the APs to one of the UEs. For example, if $\eta$=0.6, the transmit power from an AP to a UE may be $0.6*P_{max}$. In some embodiments, the parameter T1 may include or correspond to a first predefined threshold. The parameter T2 may include or correspond to a second predefined threshold. In some embodiments, the parameter C may indicate/specify a predefined threshold. The predefined threshold may indicate/specify a minimum number of RS resources included in the first set of RS resources.

In some embodiments, the wireless communication device may receive/obtain/acquire at least one of the M, the K, the $P_{max}$, the η, the T1, the T2, and/or the C from the wireless communication node (e.g., a CPU). For example, a CPU may provide/specify/indicate/send/communicate at least one of the M, the K, the $P_{max}$, the η, the T1, the T2, and/or the C to a UE. In some embodiments, the wireless communication device may determine/configure/calculate the β according to G. The parameter G may specify/indicate/refer to a channel response or matrix. The channel response or matrix may be associated/related with one of the set of RS resources for channel measurement. In some embodiments, the wireless communication device may determine/configure/calculate the β as a function of the G. For instance, the wireless communication device may determine the β according to (or by using) $β=(|G|)^2$. In some embodiments, the wireless communication device may sort/organize/arrange/order values of the β for different ones of the set of RS resources for channel measurement. For instance, the wireless communication device may sort the values of the β into values of β' according to size. Responsive to sorting the values of the β, the wireless communication device may select/identify the first P values of the values of the β' to satisfy/meet:

$$\frac{\sum_{i=1}^{P} \beta'_{ik}}{\sum_{m=1}^{M} \beta_{mk}} \geq T_1$$

and/or P≥C. The selected values of the β' may correspond to (or be associated with) the AP(s) that are used as the service AP set. The parameter k may indicate/specify that the wireless communication device is a k-th UE of the UEs. Furthermore, the parameter i may be an indicator of one RS resource of the set of RS resources for channel measurement, and/or an indicator of one of the APs.

In some embodiments, the wireless communication device may sort/arrange/organize/order values of the β for different ones of the set of RS resources for channel measurement. For instance, the wireless communication device may sort values of the β into values of β' according to size. Furthermore, the wireless communication device may sort/organize values of the η to correspond to the sorted values of the β. For example, the wireless communication device may sort the values of the η into values of η'. Responsive to the sorting, the wireless communication device may select the first P values of the values of the β' and the values of the η', to satisfy $$\frac{P_{max} \times \sum_{i=1}^{P} \eta'_{ik} \times \beta'_{ik}}{P_{max} \times \left(\sum_{m=1}^{M} \beta_{mk} - \sum_{i=1}^{P} \eta'_{ik} \times \beta'_{ik}\right) + N} \geq T_2$$

and/or P≥C. The selected values of the β' and/or η' may correspond to (or be associated with) the AP(s) that are used as the service AP set. In some embodiments, the parameter k may indicate/specify that the wireless communication device is a k-th UE of the number of UE. The parameter i may be an indicator of one RS resource of the set of RS resources for channel measurement, and/or an indicator of one of the APs.

In some embodiments, the wireless communication device may determine/configure the combined RSRP according to (or based on) a transmit power (e.g., a weighted transmit power corresponding to a set of CMRs). The transmit power may correspond to the first set of RS resources. In some embodiments, the wireless communication device may determine/configure the combined RSRP (Combined_RSRP(k)) according to (or by using):

Combined_RSRP(k) =

$$P_{max} \times \sum_{i=1}^{P} \eta'_{ik} \text{ and/or } \text{Combined\_RSRP}(k) = P_{max} \times \sum_{i=1}^{P} \eta'_{ik} \times \beta'_{ik}.$$

In some embodiments, the wireless communication device may determine/configure the combined SINR according to (or based on) at least one of: a transmit power corresponding to the first set of RS resources, a total transmit power, and/or a noise power. In some embodiments, the wireless communication device may determine/configure the combined SINR (Combined_SINR(k)) according to (or by using):

$$\text{Combined\_SINR}(k) = \frac{P_{max} \times \sum_{i=1}^{P} \eta'_{ik} \times \beta'_{ik}}{P_{max} \times \left(\sum_{m=1}^{M} \beta_{mk} - \sum_{i=1}^{P} \eta'_{ik} \times \beta'_{ik}\right) + N}.$$

Referring now to operation (654), and in some embodiments, the wireless communication device may send/transmit/report/specify/indicate/communicate a first channel information (e.g., in a report or message) to a wireless communication node (e.g., BS, gNB, CPU or network). The wireless communication node may receive/obtain the first channel information from the wireless communication device. The first channel information may be associated/related with the first set of RS resources. In some embodiments, a channel state information may include/comprise the first channel information. In some embodiments, the first channel information may comprise at least one of: indicators of the first set of RS resources and/or indicators of a second set of RS resources. The second set of RS resources may be associated with the first set of RS resources. The indicators of the first/second set of RS resources may refer to the set of indices (or IDs) of N (N>=1) RS resources. In some embodiments, the first channel information may comprise at least one of: a combined RSRP, a combined SINR, a first indication information, and/or other information. In some embodiments, the first indication information may indicate/specify whether the first channel information includes the indicators of the first set of RS resources and/or the indicators of the second set of RS resources. In some embodiments, the first set of RS resources and/or the second set of RS resources may include at least one of: a set of CSI-RS resources, a set of SSB resources, and/or other resources.

In some embodiments, the wireless communication device may send/transmit/communicate/broadcast the first channel information to the wireless communication node responsive to an enable parameter. For example, the wireless communication device may send/report the first channel information responsive to receiving/obtaining the enable parameter. The wireless communication node may receive/obtain the first channel information from the wireless communication device responsive to the enable parameter. The wireless communication device may receive/obtain the enable parameter from the wireless communication node via RRC signaling and/or configuration, for instance. Furthermore, the first channel information may include the indicators of the second set of RS resources, when the number of RS resources in the first set RS resources is larger than or equal to a threshold. The threshold may be equal to (or correspond to) half of the number of the set of RS resources. Control signaling (e.g., RRC signaling, MAC-CE signaling, DCI, and/or other types of signaling) can be used to indicate/ specify/provide/communicate the threshold.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:

determining, by a wireless communication device, a first set of reference signal (RS) resources, the first set of RS resources comprising RS resources for channel measurement;

sending, by the wireless communication device to a wireless communication node, a first channel information associated with the first set of RS resources, wherein the first channel information comprises an indication of the first set of RS resources, the first channel information is included in channel state information (CSI), and the first set of RS resources includes: a set of channel state information reference signal (CSI-RS) resources or a set of synchronization signal block (SSB) resources, wherein the first channel information comprises an indication of a combined reference signal received power (RSRP), where the combined RSRP is computed as a sum of transmit power corresponding to each RS source of the first set of RS resources and a weight factor; and determining, by the wireless communication device, the combined RSRP (Combined RSRP (k)) according to:

$$\text{Combined\_RSRP}(k) = P_{max} \times \sum\nolimits_{i=1}^{P} \eta'_{ik},$$

$$\text{or } \text{Combined\_RSRP}(k) = P_{max} \times \sum\nolimits_{i=1}^{P} \eta'_{ik} \times \beta'_{ik}.$$

wherein $\eta'_{ik}$ is the RSRP of a RS resource with index i in the first set of RS. $\beta'_{ik}$ is weighted factor of the the RSRP of the RS resource with index i.

2. The method of claim 1, wherein the first channel information further comprises at least one of:

indicators of a second set of RS resources associated with the first set of RS resources, a first indication information, or an indication of a combined signal-to-interference-plus-noise ratio (SINR).

3. The method of claim 2, wherein the first channel information further comprises the combined SINR, the method further comprising:

determining, by the wireless communication device, the combined SINR according to at least one of: a transmit power corresponding to the first set of RS resource, a total transmit power, or a noise power.

4. The method of claim 3, comprising:

determining, by the wireless communication device, the combined SINR (Combined_SINR(k)) according to:

$$\text{Combined\_SINR}(k) = \frac{P_{max} \times \sum\nolimits_{i=1}^{P} \eta'_{ik} \times \beta'_{ik}}{P_{max} \times \left( \sum\nolimits_{m=1}^{M} \beta_{mk} - \sum\nolimits_{i=1}^{P} \eta'_{ik} \times \beta'_{ik} \right) + N}.$$

5. The method of claim 2, wherein the first channel information further comprises the first indication information, and wherein the first indication information is indicative of whether the first channel information includes the indicator of the first set of RS resources or the indicator of the second set of RS resources.

6. The method of claim 2, wherein the first channel information includes the indicators of the second set of RS resources, when the number of RS resources in the first set RS resources is larger than or equal to a threshold, wherein the threshold is equal to half of the number of the set of RS resources, or the threshold is indicated by a control signaling.

7. The method of claim 1, comprising:

determining, by the wireless communication device, the first set of RS resources according to at least one of: a set of RS resources for channel measurement, M, K, β, $P_{max}$, η, T1, T2, or C, wherein:

M is a number of RS resources in the set of RS resources for channel measurement, or a number of access points (APs), K is a number of user equipment (UEs) including the wireless communication device, β is a channel large scale parameter associated with one of the first set of RS resources for channel measurement, $P_{max}$ is a maximum transmit power for one of the set of RS resources for channel measurement, or a maximum transmit power for one of the APs, η is a transmit power factor for one of the set of RS resources for channel measurement or a transmit power factor from one of the APs to one of the UEs, T1 is a first predefined threshold, T2 is a second predefined threshold, and C is a predefined threshold that refers to a minimum number of RS resources included in the first set of RS resources.

8. The method of claim 7, comprising:

receiving, by the wireless communication device from the wireless communication node, information about at least one of the M, the K, the $P_{max}$, the η, the T1, the T2, or the C.

9. The method of claim 7, wherein the first set of RS resources is determined according the β, the method further comprising:

determining, by the wireless communication device, the β according to G, wherein G refers to a channel response or matrix associated with one of the set of RS resources for channel measurement.

10. The method of claim 9, comprising:

determining, by the wireless communication device, the β:

as a function of the G, or according to: $\beta = (|G|)^2$.

11. The method of claim 7, wherein the first set of RS resources is determined according to the β, the method further comprising:

sorting, by the wireless communication device, values of the β for different RS resources of the first set of RS resources for channel measurement, according to size, into values of β'; and selecting, by the wireless communication device, first P values of the values of the β' to satisfy:

$$\frac{\sum\nolimits_{i=1}^{P} \beta'_{ik}}{\sum\nolimits_{m=1}^{M} \beta_{mk}} \geq T_1, \text{ and}$$

$$P \geq C,$$

wherein k indicates that the wireless communication device is a k-th UE of the UEs, and i is an indicator of one RS resource of the set of RS resources for channel measurement, or an indicator of one of the APs.

12. The method of claim 7, wherein the first set of RS resources is determined according to the β, the method further comprising:

sorting, by the wireless communication device, values of the β for different resources of the first set of RS resources for channel measurement, according to size, into values of β';

sorting, by the wireless communication device, values of the η to correspond to the sorted values of the β, into values of η'; and selecting, by the wireless communication device, first P values of the values of the β' and the values of the η', to satisfy:

$$\frac{P_{max} \times \sum_{i=1}^{P} \eta'_{ik} \times \beta'_{ik}}{P_{max} \times \left( \sum_{m=1}^{M} \beta_{mk} - \sum_{i=1}^{P} \eta'_{ik} \times \beta'_{ik} \right) + N} \geq T_2,$$

$$P \geq C,$$

wherein k indicates that the wireless communication device is a k-th UE of the number of UE, and i is an indicator of one RS resource of the set of RS resources for channel measurement, or an indicator of one of the APs.

13. The method of claim 1, comprising:

sending, by the wireless communication device to the wireless communication node, the first channel information, responsive to an enable parameter.

14. A method comprising:

receiving, by a wireless communication node from a wireless communication device, a first channel information associated with a first set of reference signal (RS) resources, wherein the wireless communication device determines the first set of RS resources, and the first set of RS resources comprise RS resources for channel measurement, wherein the first channel information comprises an indication of the first set of RS resources, the first channel information is included in channel state information (CSI), and the first set of RS resources includes: a set of channel state information reference signal (CSI-RS) resources or a set of synchronization signal block (SSB) resources, wherein the first channel information comprises as indication of a combined reference signal received power (RSRP), where the combined RSRP is computed as a sum of transmit power corresponding to each RS source of the first set of RS resources and a weight factor, and wherein the wireless communication device determines the combined RSRP (Combined RSRP (k)) according to:

$$Combined\_RSRP(k) = P_{max} \times \sum_{i=1}^{P} \eta'_{ik},$$

$$or \ Combined\_RSRP(k) = P_{max} \times \sum_{i=1}^{P} \eta'_{ik} \times \beta'_{ik}.$$

wherein η'$_{ik}$ is the RSRP of a RS resource with index i in the first set of RS. β'$_{ik}$ is weighted factor of the the RSRP of the RS resource with index i.

15. A wireless communication device comprising:

at least one processor configured to:

determine a first set of reference signal (RS) resources, the first set of RS resources comprising RS resources for channel measurement; and send, via a transmitter to a wireless communication node, a first channel information associated with the first set of RS resources, wherein the first channel information comprises an indication of the first set of RS resources, the first channel information is included in channel state information (CSI), and the first set of RS resources includes: a set of channel state information reference signal (CSI-RS) resources or a set of synchronization signal block (SSB) resources, wherein the first channel information comprises an indication of a combined reference signal received power (RSRP), where the combined RSRP is computed as a sum of transmit power corresponding to each RS source of the first set of RS resources and a weight factor determining, by the wireless communication device, the combined RSRP (Combined RSRP (k)) according to:

$$Combined\_RSRP(k) = P_{max} \times \sum_{i=1}^{P} \eta'_{ik},$$

$$or \ Combined\_RSRP(k) = P_{max} \times \sum_{i=1}^{P} \eta'_{ik} \times \beta'_{ik}.$$

wherein η'$_{ik}$ is the RSRP of a RS resource with index i in the first set of RS. β'$_{ik}$ is weighted factor of the the RSRP of the RS resource with index i.

16. A wireless communication node comprising:

at least one processor configured to:

receive, via a receiver from a wireless communication device, a first channel information associated with a first set of reference signal (RS) resources, wherein the wireless communication device determines the first set of RS resources, and the first set of RS resources comprise RS resources for channel measurement, wherein the first channel information comprises an indication of the first set of RS resources, the first channel information is included in channel state information (CSI), and the first set of RS resources includes: a set of channel state information reference signal (CSI-RS) resources or a set of synchronization signal block (SSB) resources, wherein the first channel information comprises an indication of a combined reference signal received power (RSRP) where the combined RSRP is computed as a sum of transmit power corresponding to each RS source of the first set of RS resources and a weight factor, and wherein the wireless communication device determines the combined RSRP (Combined RSRP (k)) according to:

$$Combined\_RSRP(k) = P_{max} \times \sum_{i=1}^{P} \eta'_{ik},$$

$$or \ Combined\_RSRP(k) = P_{max} \times \sum_{i=1}^{P} \eta'_{ik} \times \beta'_{ik}.$$

wherein η'$_{ik}$ is the RSRP of a RS resource with index i in the first set of RS. β'$_{ik}$ is weighted factor of the the RSRP of the RS resource with index i.

\* \* \* \* \*